United States Patent [19]

Mauz

[11] Patent Number: 5,257,821
[45] Date of Patent: Nov. 2, 1993

[54] STEERING AXLE FOR TRACK-GUIDABLE COMMERCIAL VEHICLES, PARTICULARLY BUSES

[75] Inventor: Uwe Mauz, Esslingen, Fed. Rep. of Germany

[73] Assignee: Mercedes-Benz AG, Fed. Rep. of Germany

[21] Appl. No.: 817,806

[22] Filed: Jan. 8, 1992

[30] Foreign Application Priority Data

Jan. 8, 1991 [DE] Fed. Rep. of Germany ....... 4100294

[51] Int. Cl.⁵ .................. B61C 11/00; B62D 1/00
[52] U.S. Cl. .................. 280/846; 105/215.1; 105/72.2
[58] Field of Search .......... 280/846, 675, 96.1, 280/691; 105/215.1, 72.2; 104/243

[56] References Cited

U.S. PATENT DOCUMENTS

| | | | |
|---|---|---|---|
| 3,208,400 | 9/1965 | Bingham | 105/215.1 |
| 3,393,762 | 7/1968 | Matson | 104/243 |
| 3,812,789 | 5/1974 | Nelson | 105/215.1 |
| 4,454,819 | 6/1989 | Cuylits et al. | 104/245 |

FOREIGN PATENT DOCUMENTS

3704512 8/1988 Fed. Rep. of Germany.

Primary Examiner—Karin L. Tyson
Assistant Examiner—Paul Dickson
Attorney, Agent, or Firm—Evenson, McKeown, Edwards & Lenahan

[57] ABSTRACT

Steering apparatus for track-guidable buses or similar commercial vehicles, in which a supporting arm carrying a track guiding roller is conventionally held on a wheel carrier and extends in the driving direction, reaching outward in front of the vehicle wheel, each wheel carrier being equipped with a control arm connected by means of a tie rod. The supporting arms according to the invention at the same time forms the steering arm, and the tie rod disposed between the steering arms supports the lateral guiding forces in the straight-ahead driving position of the wheels.

5 Claims, 10 Drawing Sheets

STEERING AXLE FOR TRACK-GUIDABLE COMMERCIAL VEHICLES, PARTICULARLY BUSES

BACKGROUND AND SUMMARY OF THE INVENTION

This invention relates to a steering axle for track-guidable commercial vehicles, particularly buses.

A steering axle of this type, known as a rigid axle, is disclosed in German Patent Document DE-OS 37 04 5 12. In this axle construction, the steering arms, which are rigidly connected with the steering knuckles, extend opposite to the driving direction. Accordingly, the tie rod, the ends of which are pivotally connected to the steering arms, is situated on the end of the axle opposite that which bears the supporting arms for the track guiding of the commercial vehicle.

Each of the supporting arms carries a cross guiding roller. During the drive along a track guiding path, the wheel guiding lateral forces are transmitted by way of the track guiding rollers on their track-determining cross-guiding webs, to the supporting arms extending from the axle knuckles in the driving direction. As a result of the lateral forces, and the substantial length of the supporting arm sections extending in the driving direction, bending moments are generated which require a large supporting arm cross-section and a correspondingly heavy supporting arm. The weight proportion of the supporting arms in the unsprung axle mass is therefore considerable.

It is an object of the present invention to provide a steering axle of the generic type described above, which requires low construction expenditures, and for which the weight of the supporting arms can be reduced considerably.

This object is achieved according to the invention, in which the steering arm assigned to a wheel carrier and the supporting arm form a common component, and the tie rod takes over the support of the lateral guiding forces transmitted by the track guiding rolls to the supporting arms. This eliminates equipping the axle supports with a special steering arm, and the tie rod, which is pivotally connected with the supporting arms and absorbs the lateral guiding forces, permits a correspondingly slender supporting arm construction which therefore reduces its weight. The wheel carriers may be assigned to an independent wheel suspension or to a rigid axle respectively.

Other objects, advantages and novel features of the present invention will become apparent from the following detailed description of the invention when considered in conjunction with the accompanying drawings.

DETAILED DESCRIPTION OF THE DRAWINGS

Figure 2:
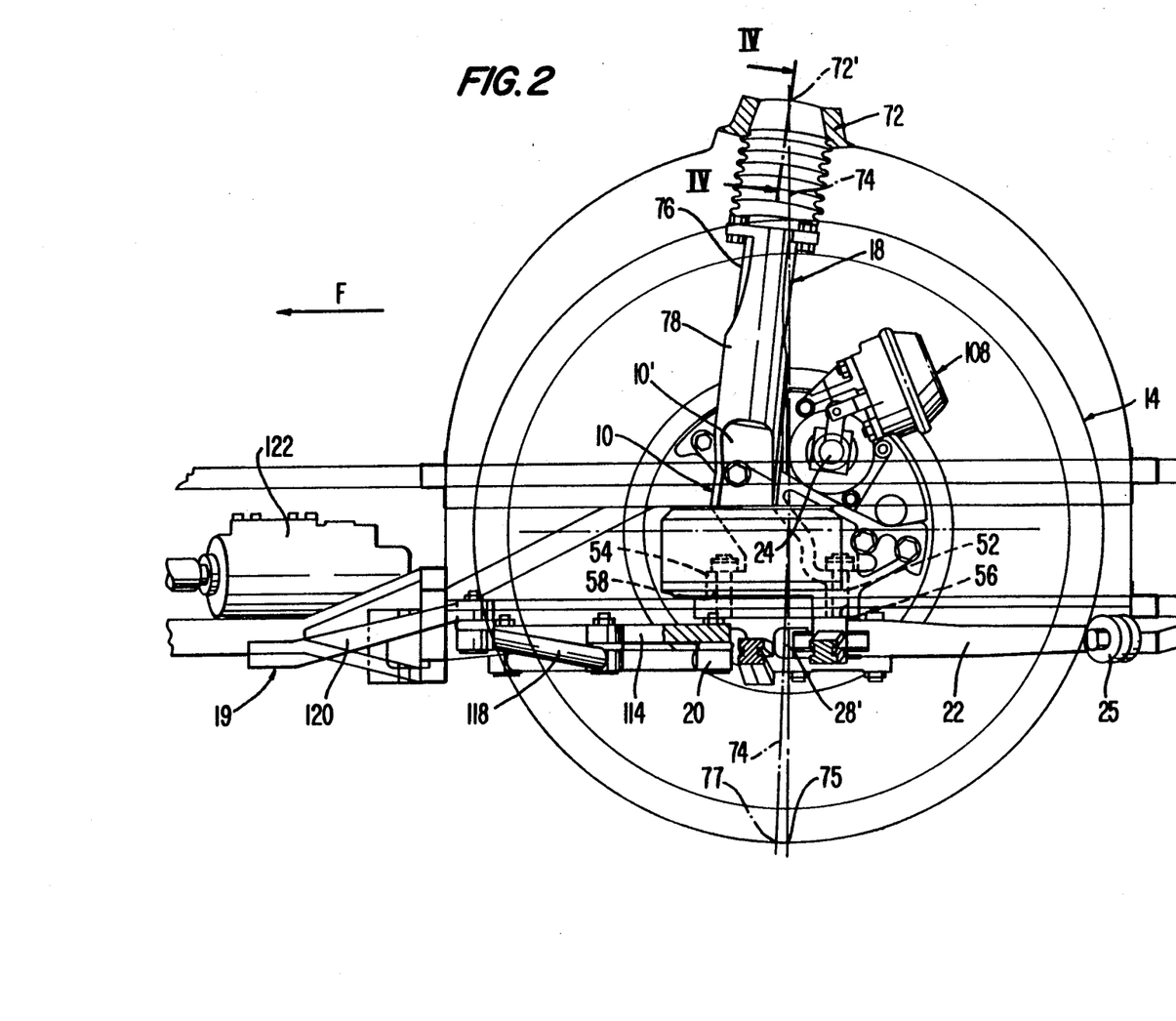
FIG. 2 is a sectional view of the steering axle along Line II—II of FIG. 1.
Figure 3:
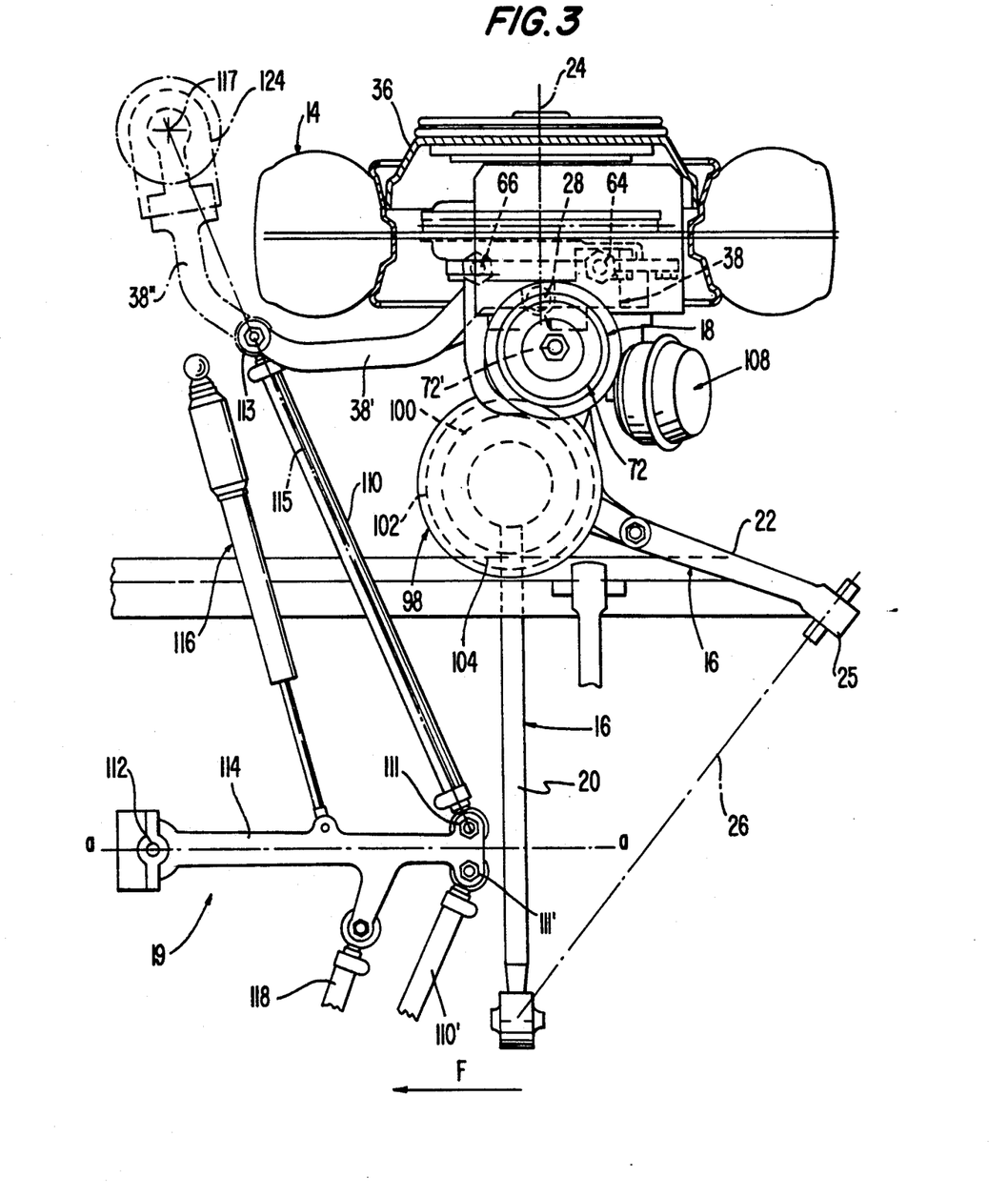
FIG. 3 is a top view of the representation according to FIG. 2.

The illustrated steering axle has two independent wheel suspensions which correspond to one another (only one of which is shown). This one suspension comprises a wheel carrier 10 having a journal 12 on which a wheel 14 is rotatably disposed. The wheel carrier 10 is guided by means of a lower semi-trailing arm 16, an upper suspension link which is, for example, constructed as a shock absorber strut 18, and a steering device 19 (FIGS. 2, 3).

The semi-trailing arm 16 comprises a control arm 20 (which preferably extends beyond the longitudinal center plane a—a of the vehicle, forming a transverse link) and by a control arm 22, which is rigidly connected with control arm 20 and forms a longitudinal link. When viewed in the top view and relative to the driving direction F, control arm 22 is situated behind the wheel spin axis 24 and extends diagonally toward the front and outside and, in the design condition, essentially horizontally. (See FIG. 3.) The control arm 20, starting from its connecting point with control arm 22, is situated forward of the wheel spin axis 24, relative to the driving direction F. Accordingly, the corresponding control arm for the opposite wheel suspension is provided behind the wheel spin axis 24.

The bearings 23 and 25 of the two control arms 20 and 22 which are fixed to the vehicle body, because of a correspondingly selected control arm length and a corresponding control arm fitting, define a semi-trailing arm swivelling axis 26 which, viewed in the top view (FIG. 3) and relative to the driving direction F, is situated behind the wheel spin axis 24 and extends diagonally from the inside toward the rear outside. Swivel axis 26 takes up a diagonal position of between 35° and 60°, preferably 50°, with respect to the longitudinal center plane a—a of the vehicle.

In this manner, a correspondingly wide supporting base is created for the semi-trailing arm 16 on the vehicle body side, so that as a result of the design length of the two control arms 20 and 22 and of the fitting of the semi-trailing arm 16 into the steering axle, axle kinematics are achieved which, among others minimize, camber changes due to compressions and rebounds.

Figure 6:
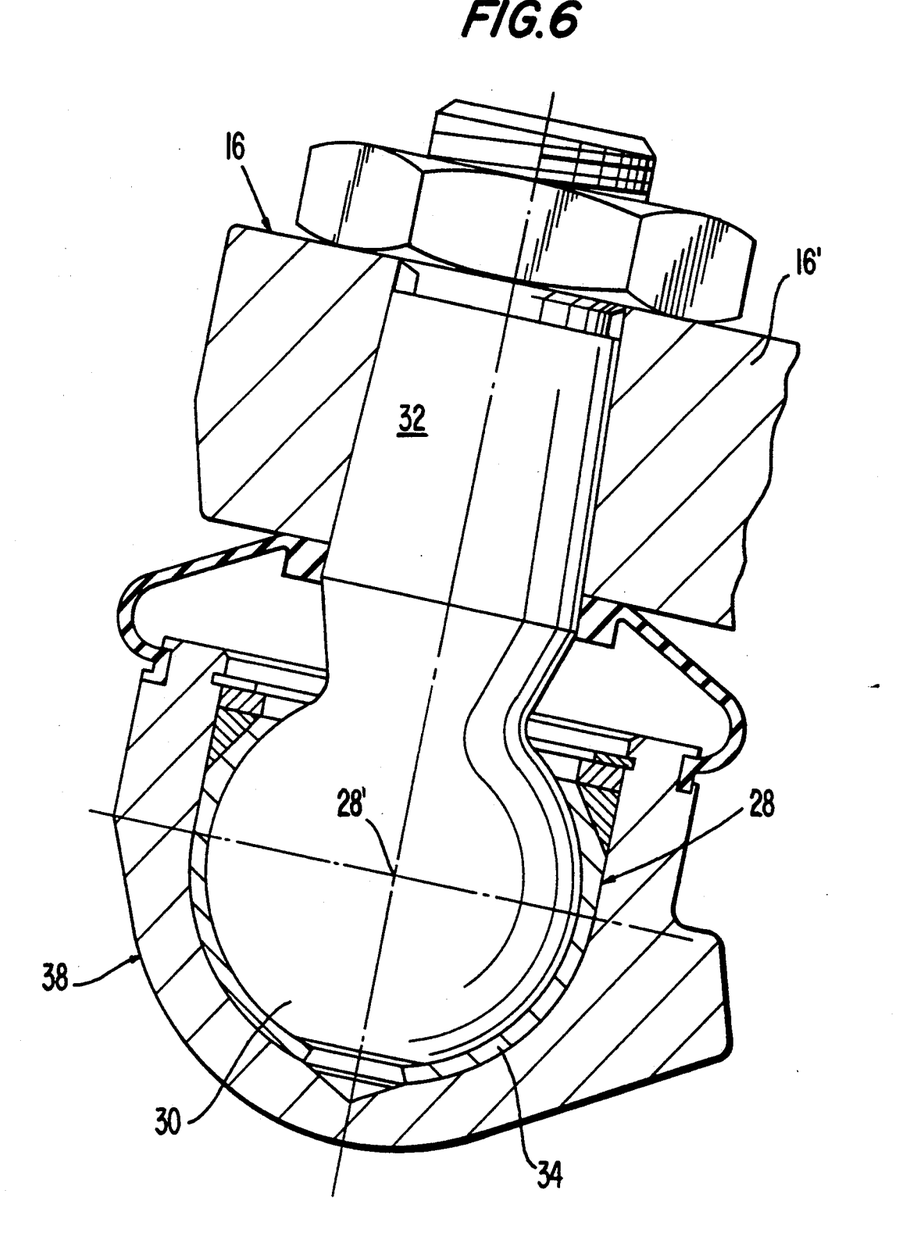
FIG. 6 is a sectional view along Line VI—VI of FIG. 5.
Figure 7:
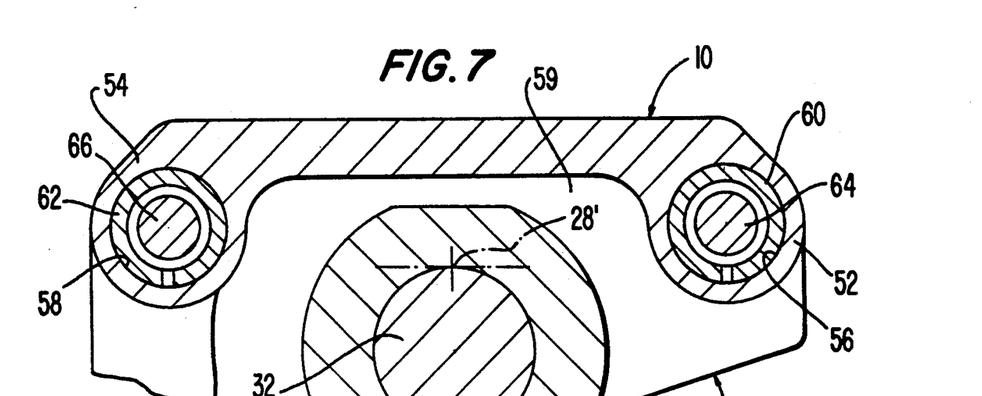
FIG. 7 is a sectional view along Line VII—VII of FIG. 5.
Figure 8:
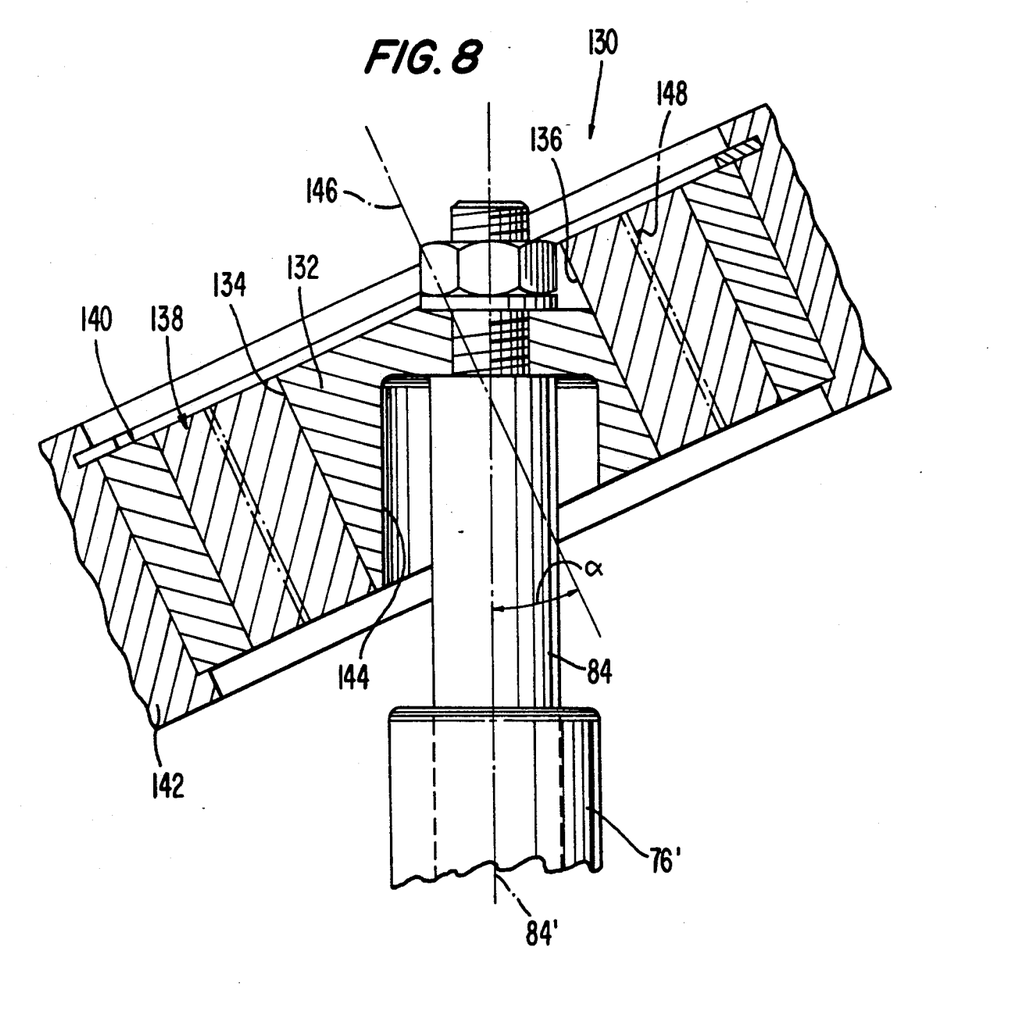

The pivotal connection of the semi-trailing arm 16 on the wheel carrier 10 is achieved by means of a suspended supporting joint 28 (see FIG. 6) which forms a ball joint. Its spherical part 30 is disposed on a preferably conical journal 32 which, in turn, is held in the wheel-carrier-side end piece 16' of the semi-trailing arm 16, with the spherical part 30 on the bottom side thereof.

A ball socket 34, which receives the spherical part 30, is provided, preferably by molding, in an end piece of a supporting member 38 fastened to the bottom side of the wheel carrier 10 inside the wheel rim 36. The ball socket 34 is situated between two upper steering arm frontal areas 40 and 42 provided in the same plane, with respect to which, when the supporting joint 28 is mounted, its journal 32 is directed at an acute angle upwards and inwards in the transverse direction of the vehicle. (See FIG. 6.)

The frontal areas 40 and 42 each form an upper front face of a fastening lug 44 and 46 molded to the supporting member 38 which, in each case, is penetrated by a longitudinal bore 48 and 50.

In an alignment with these bores 48 and 50, lower fastening lugs 52 and 54 of the wheel carrier 10 are also each penetrated by a bore 56 and 58. These fastening lugs 52 and 54 bound an indentation 59 of the wheel carrier 10 which opens upward toward the inside (in the transverse direction of the vehicle) and which partially receives the end piece 16' of the semi-trailing arm 16 which is disposed on the journal 32 of the supporting joint 28. (See FIG. 6.)

Figure 5:
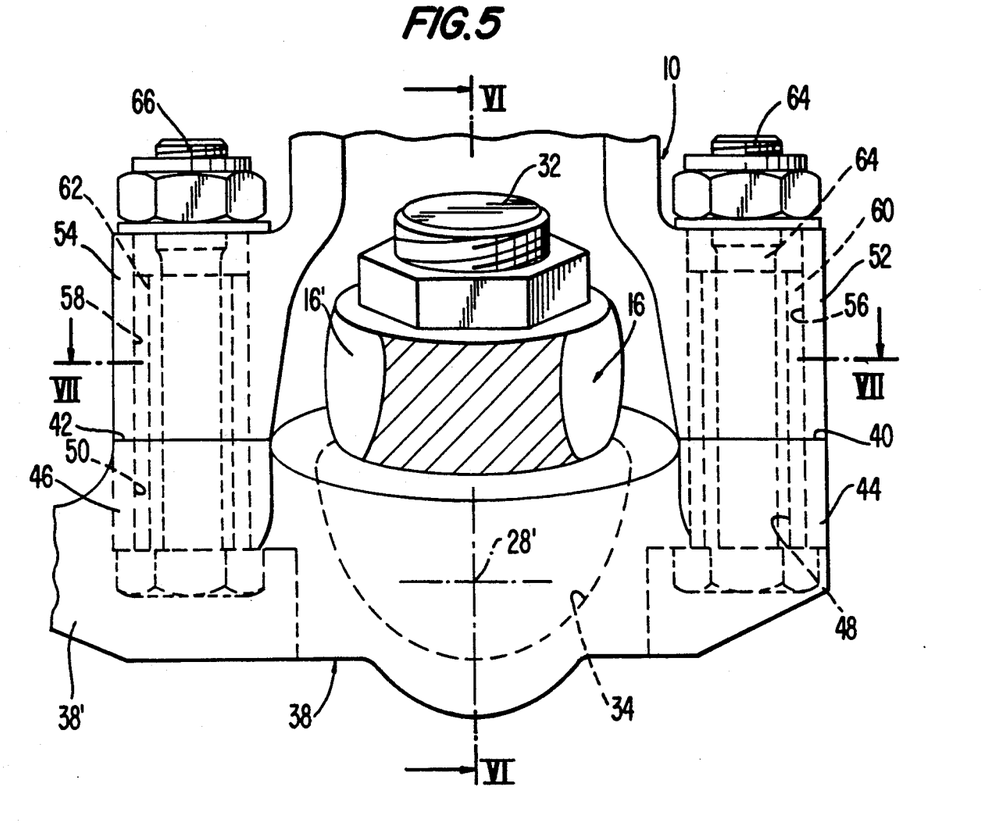
FIG. 5 is a view of the lower part of the wheel carrier viewed in the direction of the arrow C of FIG. 1.

By means of shear bushings 60 and 62 respectively inserted into the bores 48, 50, 56, 58 and the screws 64 and 66 (see FIG. 5), the supporting member 38 is securely fixed to the wheel carrier 10.

A connecting part 38', which projects toward the inside in the transverse direction of the vehicle, extends from the supporting member 38 in the driving direction F. Together, both parts 38 and 38' form a steering arm.

Figure 1:
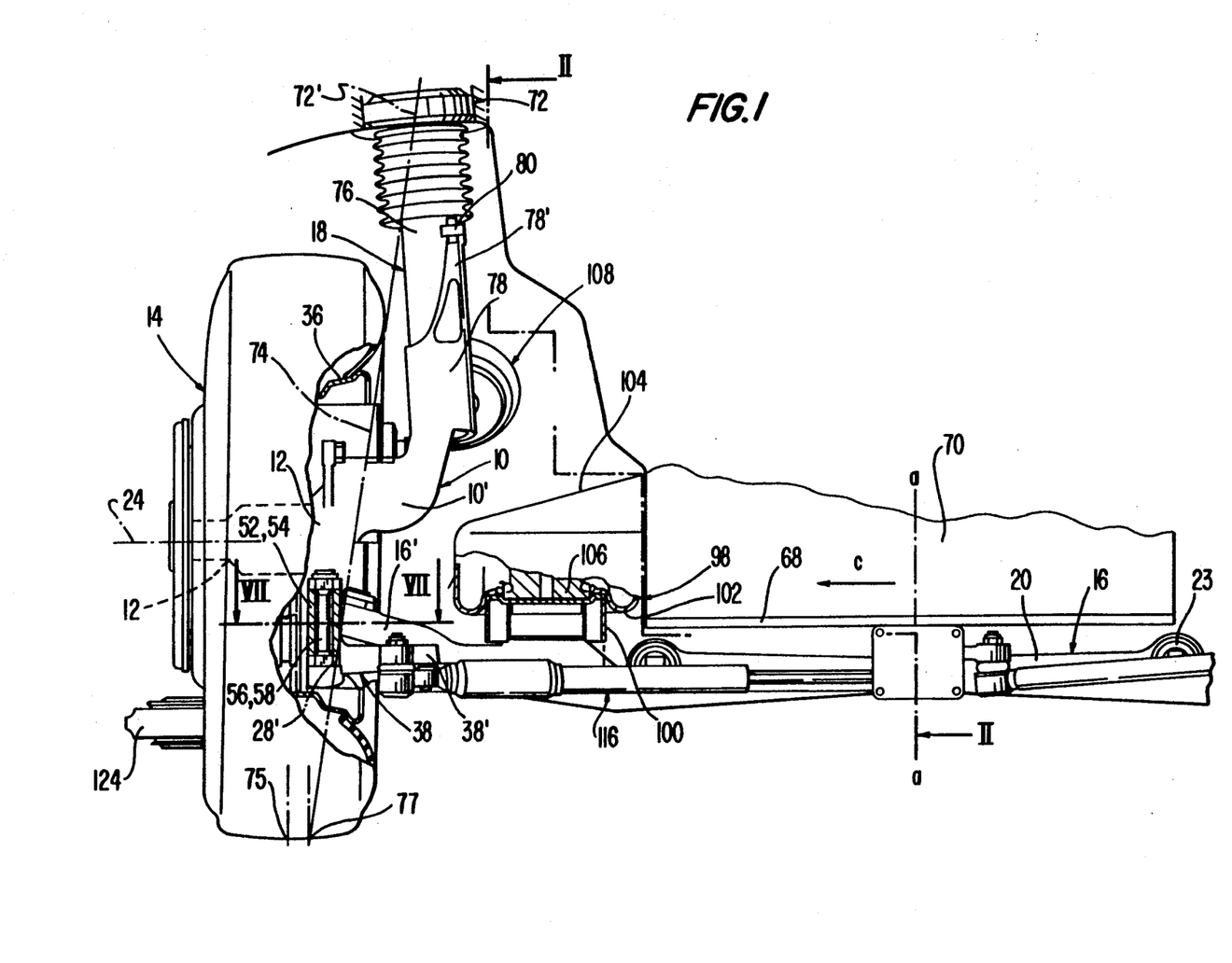
FIG. 1 is a front view of a steering axle for a low-floor bus equipped with independent wheel suspension.

As shown in FIG. 1, pivot point 28' of the supporting joint 28 is situated approximately in the horizontal plane of the control arm 20 of the semi-trailing arm 16, which is longer and is directed in the transverse direction of the vehicle. This is achieved by a corresponding offset of the semi-trailing arm end piece 16' diagonally upwards. As a result, it is possible to place the height of a floor 68 (such as a gangway of a bus body extending in the longitudinal center plane a—a) very low above the axles.

As indicated by FIGS. 1 and 2, the shock absorber strut 18 is fitted into the independent wheel suspension preferably in such a manner that it extends, from its upper elastic guiding joint 72, which is fixed to the vehicle body, in the transverse direction of the vehicle, diagonally downward toward the inside and, relative to the driving direction F, downward toward the front.

The pivot point 28' of the supporting joint 28 and the pivot point 72' of the guiding joint 72 of the shock absorber strut 18 define a steering axis 74 which, due to its inclination, results in a positive kingpin offset and (viewed in the driving direction F) in a track point 77 which is situated in front of the wheel contact point 75 (FIG. 2), and thus in a positive caster.

The lower end piece of the cylindrical pipe 76 of the shock absorber strut 18 ends at a correspondingly large distance above the semi-trailing arm end piece 16' (see FIG. 1) and, for this purpose, is held in an upwardly directed neck 78 which is held by a wheel carrier projection 10' extending above the control arm end piece 16' in the transverse direction of the vehicle.

Even in the event of spring movements of the wheel 14, the semi-trailing arm arrangement ensures an extensive constancy of the inclination. Moreover, the bending stress of the cylindrical pipe 76 of the shock absorber strut from bending moments resulting from lateral and longitudinal forces is correspondingly reduced by the fact that a supporting element in the form of a neck extension 78' is provided which partially reaches around the cylindrical pipe 76 along a portion of its length.

In order to provide a sufficient clearance for the wheel 14 during compression, the neck extension 78' is preferably supported on the circumferential pipe part facing the longitudinal center plane a—a of the vehicle. For generating the required reaction force, on this supporting side, a screwed connection 80 with the pipe jacket is provided on the free end of the neck extension 78'.

Figure 4:
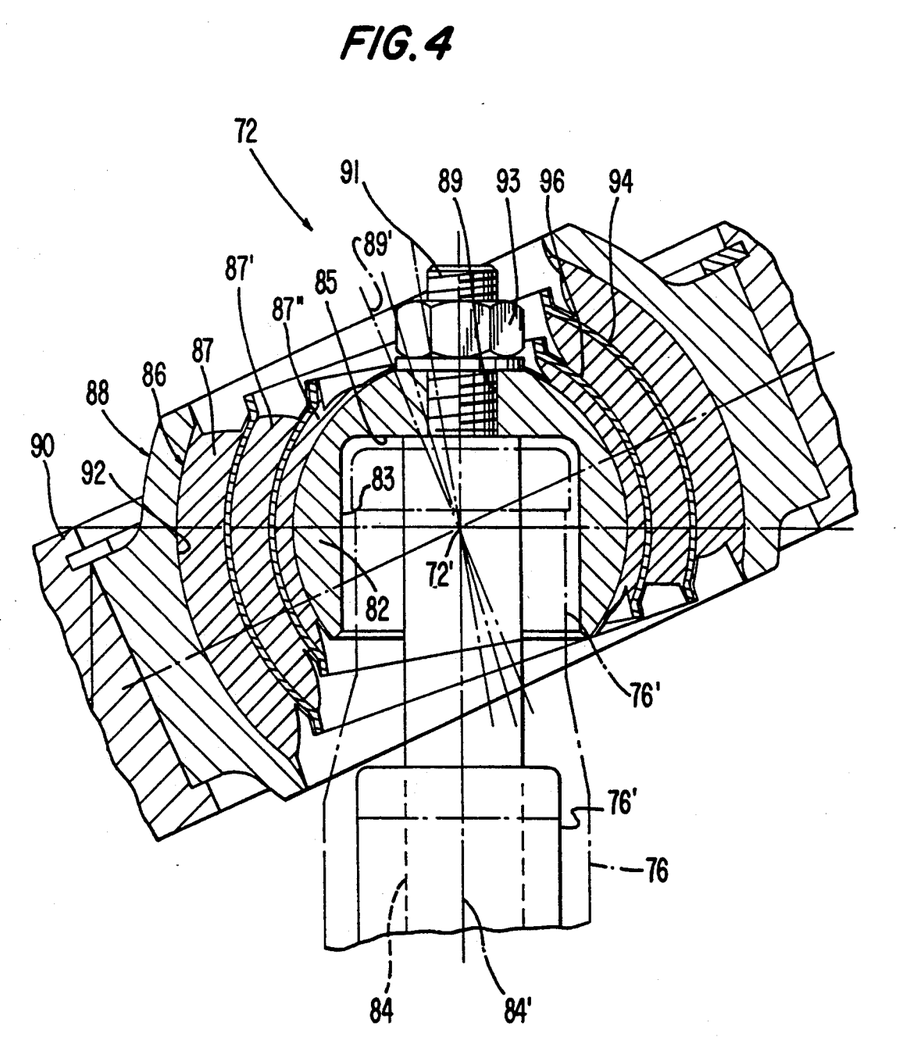
FIG. 4A is a sectional view along Line IV—IV of FIG. 2 of the guiding joint of the shock absorber strut of the steering axle, with the guiding joint shown in a relaxed condition.
FIG. 4B is a sectional view along line IV—IV of FIG. 2 of a construction variant of a guiding joint.
FIG. 4C is a sectional view of another embodiment along line IV—IV of FIG. 2.
Figure 4A:
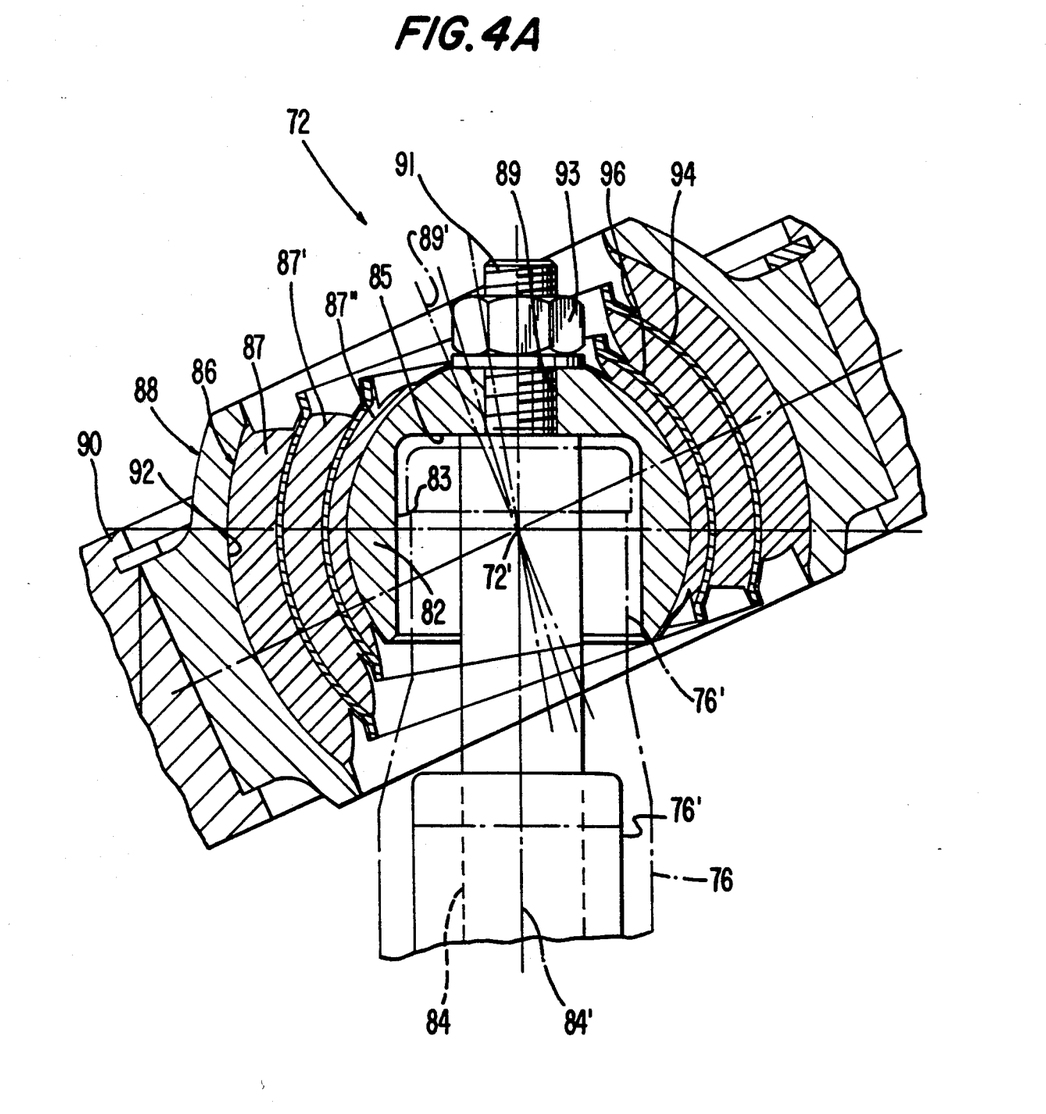

The upper guiding joint 72 is constructed so as to afford a considerable decrease of friction in the piston rod guide of the shock absorber strut 18. As illustrated in FIG. 4, it is, for this purpose, constructed as a ball joint which can be prestressed in the transverse direction of the vehicle, and is shown in the relaxed state.

Reference number 82 indicates an inner bearing part in the form of a spherical joint part fastened to the upper end of a piston rod 84. The inner bearing part 82 is vulcanized into a rubber body 86 (preferably in the form of a rubber metal element) which, in turn, is vulcanized into an outer bearing part forming the bearing housing 88. The bearing housing 88, in turn, is inserted into a support 90 which can be fastened to a receiving base of a vehicle body. (For the sake of simplicity, the receiving base is not shown in FIGS. 1 and 4).

As shown in FIG. 4, the spherical part 82 has a blind bore hole 83 which is penetrated at its bottom 85 by a central bore 89, which in turn is penetrated by a threaded shaft 91 molded onto the free front face of the piston rod 84.

The front end of the piston rod 84 is supported on the bottom 85 of the blind-hole bore 83 where it is secured by a threaded nut 93 screwed onto the threaded shaft 91.

The diameter of the blind-bore hole 83 is selected to be slightly larger than the outside diameter of the upper end piece 76' of the cylindrical pipe 76.

The engaging of the piston rod 84 in the blind bore hole 83 offers the advantage that it facilitates a relatively small distance between the pivot point 74' and the upper end piece 76' of the cylinder pipe 76 in all suspension conditions of the wheel suspension.

In the case of a maximal compression, this end piece 76' can penetrate the spherical joint part 82, which offers advantages with respect to the overall height of the wheel suspension. The arrangement of the spherical joint part 82 on the piston rod 84 is easy to achieve, and the mutual bracing of these parts 82 and 84 ensures a secure shock absorber force transmission into the ball joint 72 as well as the same type of support of tensile and pressure forces and of the torque.

The bearing housing 88 is constructed in the manner of a hollow sphere which is truncated on mutually opposite sides. It is therefore open on both sides, and its center coincides with that of the spherical joint part 82, and the rubber metal element 86 is vulcanized onto its inner circumferential surface 92.

The rubber metal element 86 comprises several partially spherical rubber body sections. For example, three such 87, 87', 87" are shown in FIG. 4. In order to achieve certain desired spring characteristics, and to generate the required bearing prestressing forces, intermediate metal sheets 94 and 96 are vulcanized to the respective body section and are constructed in the manner of hollow spheres which are truncated on mutually opposite circumferential areas, in the same manner as the rubber sections 87, 87' and 87".

In the design position of the guiding joint 72 illustrated in FIG. 4, axis 84' of the piston rod 84 extending through the hinge point 72' differs from that of the axis 89' of the bearing housing 88, penetrating pivot point 72'.

During the installing of the guiding joint 72, the bearing housing 88 and the piston rod 84 in the plane of the drawing of FIG. 4 are swivelled relative to one another such that both axes 84' and 89' preferably substantially coincide. The rubber metal element 86 is therefore prestressed in such a manner that, in the installed position of the guiding joint 72, relative to the construction position of the vehicle body, the piston rod 84 can easily break off in the upper piston rod guide of the shock absorber strut cylinder pipe 76 or is guided by means of an optimally minimized friction. For this purpose, the prestressed rubber metal element 86 seeks to swivel the piston rod 84, according to FIG. 1, clockwise and thus the shock absorber strut cylinder pipe 76 in the transverse direction of the vehicle toward the outside.

Positioning the lower support of the shock absorber strut 18 at a point far above the offset semi-trailing arm end piece 16' offers the advantage of being able to provide an air spring 98 inside the independent wheel suspension in the area close to the wheel. Supporting piston 100 of the air spring is supported on the semi-trailing arm 16 and its air bellows 102 is fixed to the vehicle body by means of a cover plate on a console 104.

This air spring arrangement, which makes it possible to design the gangway 70 of the bus body correspondingly wide, permits a favorable transmission ratio for the air spring 98. It also facilitates a dimensioning of its air bellows 102 which makes it possible to do without a helper spring in the form of a steel coil spring or, for example, a glass fiber reinforced plastic spring as a transverse leaf spring.

A buffer integrated into the air bellows 102, for a progressive course of the characteristic curves according to a predetermined compression path, has the reference number 106.

A compressed-air controlled actuating device, which is known per se, for a disk or drum brake, which is not shown in detail, as a whole, has the reference number 108.

As indicated in FIG. 3, the steering arm 38, 38', extends in front of the wheel spin axis 24 (relative to the driving direction F), out of the wheel rim 36 and essentially horizontally in the driving direction F. At its free end, a tie rod section 110 of, for example, a two-part tie rod, is pivotally connected with its one end. The other end of the tie rod section is pivotally connected to an intermediate steering arm 114 which can be pivoted about a vertical axis 112 in the longitudinal center plane a—a of the vehicle. Another tie rod section 110' also extends from the intermediate steering arm 114 in the direction of the other independent wheel suspension.

The inner joint 111 and 111' of both tie rod sections 110, 110' on the intermediate steering arm 114 is situated at a much smaller distance from the transverse plane of the vehicle containing the wheel spin axis 24 than the steering arm-side joint 113.

A steering shock absorber 116 is pivotally connected to the intermediate steering arm 114; while a steering rod 118 can be adjusted by means of a pitman arm 120 (FIG. 2) of a steering gear 122.

The direction in which the steering arm 38, 38' extends has the advantage that it can also be used, as illustrated, for a track-guidable steering of the steering axle of the low-floor bus or of another commercial vehicle. For this purpose, the steering arm 38, 38' must be correspondingly lengthened.

The steering arm 38, 38' will then extend toward the outside, while an arm section 38" reaches over the wheel 14 on the front side, and will then carry a track guiding roll 124 which rolls along a track guiding path on a cross-guiding web (not shown) during driving, and, in the process, transmits the wheel-guiding lateral guiding forces to the steering arm 38, 38', 38".

The tie rod sections 110, 110' cooperate with the intermediate steering arm 114, to bridge the distance between the steering arms 38, 38', 38" of both independent wheels suspensions and form steering arm supporting struts which favorably transmit the lateral guiding forces (particularly in the case of a straight-ahead driving position of the wheels 14) and permit a favorable slim design of the steering arm cross-sections.

For this purpose, the arrangement of the joints 111 and 113 of the tie rod section 110 and the corresponding joints of the other tie rod section 110' (of which only the inner joint 111' is shown) is selected such that the longitudinal axis 115 of the tie rod sections 110, 110', in the straight-ahead driving position of the wheels 14, points substantially at the rotating axis 117 of the track guiding roll 124 disposed on the respective steering arm 38, 38'. The outer joint 113 is disposed on the steering arm 38, 38+, 38" at its outer end and adjacent to the track guiding roll 124. Thus, in this wheel position, the tie rod, comprised of tie rod sections 110, 110', forms a bridge between the steering arms with respect to guiding forces transmitted by the track guiding rolls 124 to the steering arms 38, 38', 38" and releases the steering arms.

Finally, the arrangement of the semi-trailing arm 16 and the tie rod sections 110, 110' supported in the center of the vehicle ensure minimal toe-in changes.

Figure 4B:
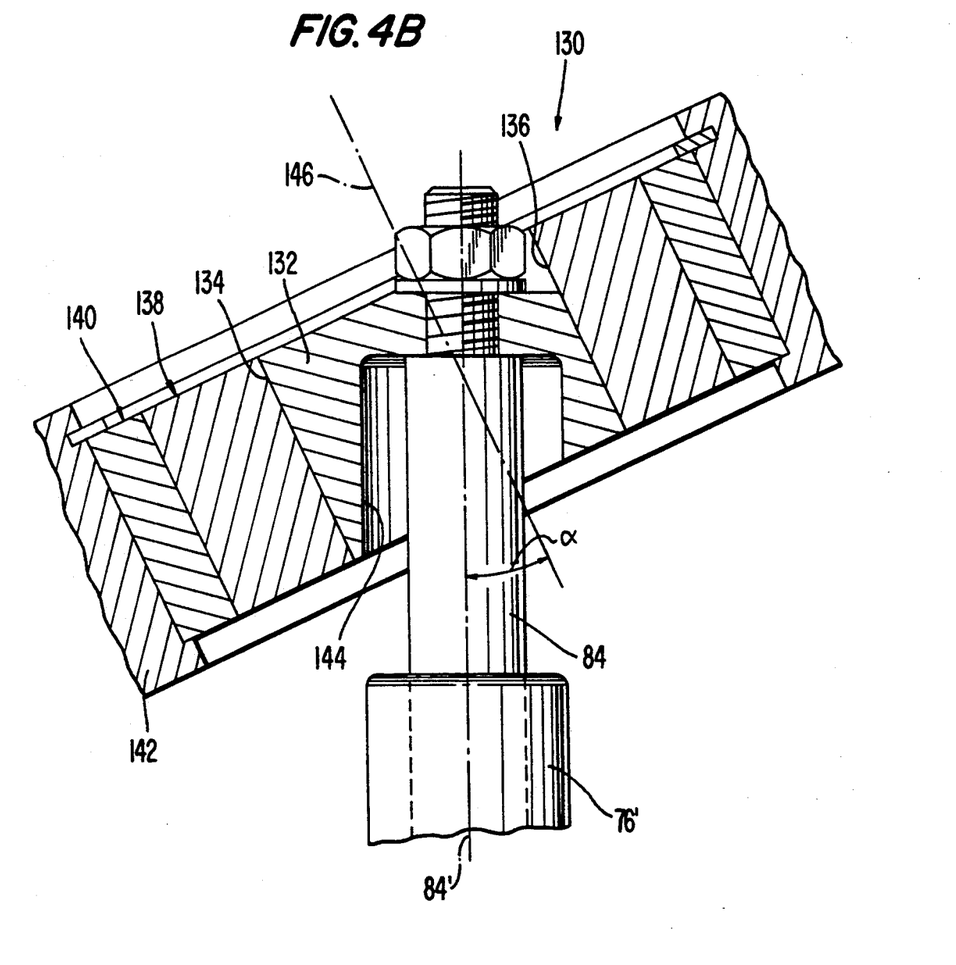

FIG. 4B illustrates another embodiment of a guiding joint which, as a whole, has the reference number 130. The inner bearing part 132, has a cylindrical circumferential surface 134 and is vulcanized into a central recess 136 of a preferably circular-ring-shaped rubber body 138 which, in turn, is vulcanized into a bearing housing 140. The latter is disposed in a bearing support 142.

A blind bore hole entered into the bearing part 132 on its front side facing the shock absorber 76, 84 has the reference number 144, the axis of the blind bore hole coinciding with the axis 84' of the piston rod 84.

To achieve the required prestressing of the guiding joint 130, the blind bore hole 144 is disposed at an angle α with respect to the bearing axis 146. The fastening of the piston rod 84 is analogous to the construction according to FIG. 4.

Figure 4C:
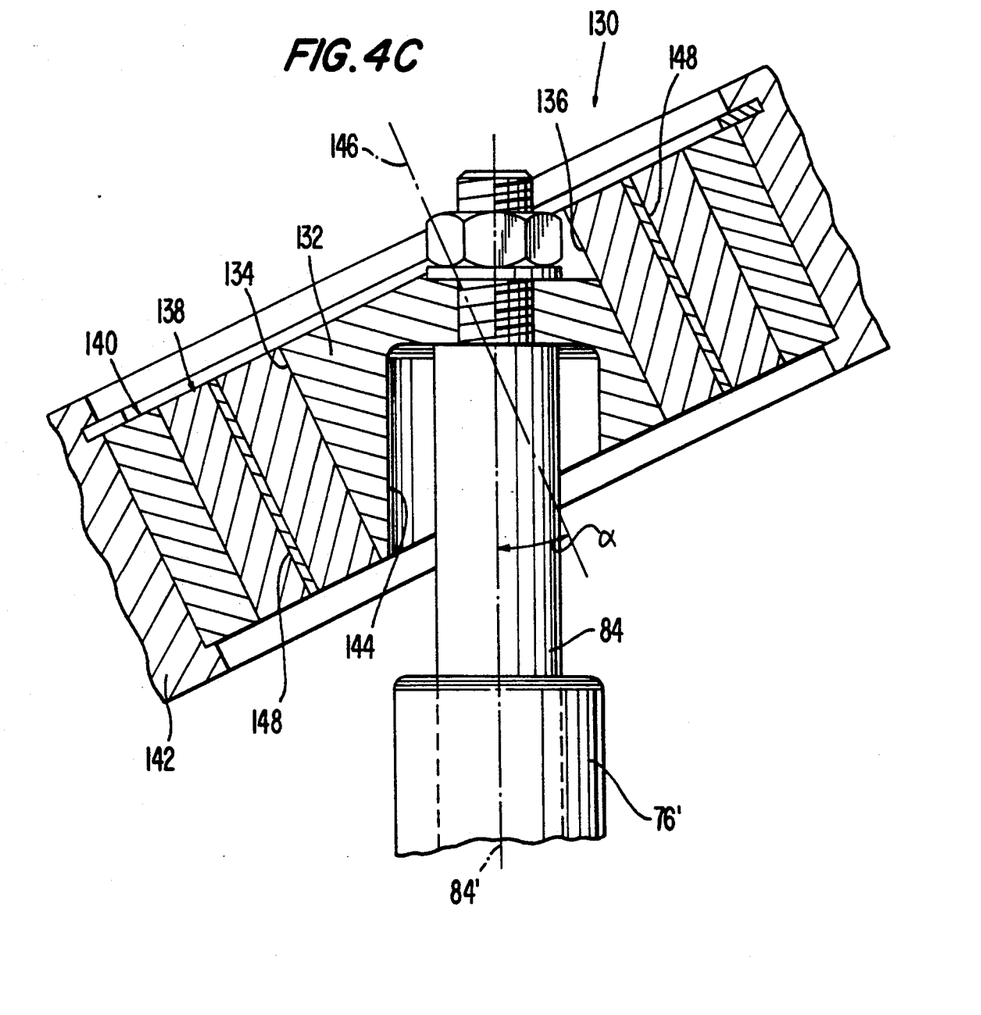

As indicated at 148 in FIG. 4C, the rubber body 138 may be constructed as a rubber metal element by the vulcanizing of at least one rubber metal element.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Steering apparatus for a track-guidable commercial vehicle of the type conventionally having:
   at least one wheel carrier having a wheel mounted thereon;
   at least one outer steering arm connected to said at least one wheel carrier at an interior side of said wheel, said at least one outer steering arm extending frontward from said wheel carrier, relative to a forward direction of said vehicle, and outward from said vehicle in front of said wheel;

a guiding roll mounted on an axis of rotation at an outwardly extending end of said at least one outer steering arm;

a steering gear; and a tie rod coupled between said at least one outer steering arm and said steering gear;

wherein said tie rod is connected to said at least one outer steering arm near an outer end thereof, adjacent to said guiding roll, and wherein a longitudinal axis of said tie rod points substantially at said axis of rotation of said guiding roll.

2. Steering apparatus according to claim 1, wherein said commercial vehicle is a bus.

3. Steering apparatus according to claim 1, wherein the tie rod comprises at least two parts, with an inner end of each of said parts being pivotally connected to an intermediate steering arm which can be swivelled by means of the steering gear, and an outer end of each of said parts being pivotally connected to said respective at least one outer steering arm.

4. A steering axle according to claim 1, wherein an intermediate steering arm, in the straight-ahead position of the wheels, extends in a longitudinal center plane of the vehicle.

5. A steering axle according to claim 3, wherein the intermediate steering arm, in the straight-ahead position of the wheels, extends in a longitudinal center plane of the vehicle.

* * * * *